United States Patent
Thurgood et al.

(10) Patent No.: US 11,034,041 B2
(45) Date of Patent: Jun. 15, 2021

(54) DELI SLICER AND PACKAGING SYSTEM

(71) Applicants: Robin Thurgood, Derry, NH (US); George Schuschereba, Derry, NH (US); Brian Bowerman, Quincy, MI (US)

(72) Inventors: Robin Thurgood, Derry, NH (US); George Schuschereba, Derry, NH (US); Brian Bowerman, Quincy, MI (US)

(73) Assignee: Beaver Lake Manufacturing, LLC

(*) Notice: Subject to any disclaimer, the term of this patent is extended or adjusted under 35 U.S.C. 154(b) by 150 days.

(21) Appl. No.: 16/291,369

(22) Filed: Mar. 4, 2019

(65) Prior Publication Data
US 2019/0193294 A1    Jun. 27, 2019

Related U.S. Application Data

(63) Continuation of application No. 15/162,138, filed on May 23, 2016, now Pat. No. 10,259,133.

(51) Int. Cl.
| | | |
|---|---|---|
| *B26D 5/00* | (2006.01) | |
| *B26D 7/30* | (2006.01) | |
| *B26D 7/32* | (2006.01) | |
| *B65B 25/06* | (2006.01) | |
| *B65B 9/02* | (2006.01) | |
| *G01G 19/03* | (2006.01) | |

(52) U.S. Cl.
CPC ............. *B26D 5/00* (2013.01); *B26D 7/30* (2013.01); *B26D 7/32* (2013.01); *B65B 9/026* (2013.01); *B65B 25/065* (2013.01); *G01G 19/035* (2013.01)

(58) Field of Classification Search
CPC .............................. B26D 2210/02; B26D 7/32
See application file for complete search history.

(56) References Cited

U.S. PATENT DOCUMENTS

| | | | | |
|---|---|---|---|---|
| 3,355,008 | A | | 11/1967 | Milazzo |
| 4,026,421 | A | * | 5/1977 | Lotz ....................... B65B 35/50 |
| | | | | 414/790.4 |
| 4,048,784 | A | | 9/1977 | Toby |
| 4,084,784 | A | | 4/1978 | Labelle |
| 4,405,186 | A | * | 9/1983 | Sandberg ................. B26D 7/32 |
| | | | | 271/218 |
| 4,875,533 | A | | 10/1989 | Mihara |
| 5,107,731 | A | | 4/1992 | Kent |
| 5,187,922 | A | | 2/1993 | Mast |
| 5,410,929 | A | * | 5/1995 | Wallace ................... B26D 1/09 |
| | | | | 241/263 |

(Continued)

OTHER PUBLICATIONS

US 9,156,181 B2, 10/2015, McLaughlin et al. (withdrawn)

*Primary Examiner* — Andrew M Tecco
*Assistant Examiner* — Eyamindae C Jallow
(74) *Attorney, Agent, or Firm* — Lambert Shorten & Connaughton; Gary E. Lambert; David J. Connaughton, Jr.

(57) ABSTRACT

An automated food slicing device is provided. The automated food slicing device may automate the cutting, packaging, and/or labelling of food items such as delicatessen food items. The automated food slicing device may also have a computerized input that allows a user to provide inputs regarding selected options which the slicing device will follow to provide a customized food product.

20 Claims, 5 Drawing Sheets

(56) References Cited

U.S. PATENT DOCUMENTS

| | | | |
|---|---|---|---|
| 5,601,005 | A | 2/1997 | Petersen et al. |
| 5,784,936 | A | 7/1998 | King |
| 6,044,739 | A * | 4/2000 | Abler ................ B26D 3/28 |
| | | | 426/518 |
| 6,155,322 | A | 12/2000 | Landan |
| 7,065,936 | B2 | 6/2006 | Lindee et al. |
| 7,493,841 | B1 * | 2/2009 | Kaplan ............... B26D 1/147 |
| | | | 241/262 |
| 7,581,474 | B2 * | 9/2009 | Weber ................ B26D 5/00 |
| | | | 83/29 |
| 7,721,638 | B2 | 5/2010 | Verhalen et al. |
| 8,408,108 | B2 * | 4/2013 | Redemann .......... B26D 1/143 |
| | | | 83/356 |
| 8,893,599 | B2 * | 11/2014 | Reifenhaeuser ..... B26D 7/32 |
| | | | 83/23 |
| 2002/0073649 | A1 | 6/2002 | Gamberini |
| 2006/0266617 | A1 * | 11/2006 | Mustalahti ......... B65G 17/18 |
| | | | 198/321 |
| 2009/0293423 | A1 | 12/2009 | Schuller |
| 2010/0065401 | A1 * | 3/2010 | Dowe ............... B65G 17/24 |
| | | | 198/401 |
| 2011/0265431 | A1 * | 11/2011 | Ramabadran ...... B26D 7/34 |
| | | | 53/513 |
| 2013/0104709 | A1 * | 5/2013 | Rother ............... B26D 7/00 |
| | | | 83/23 |
| 2013/0139665 | A1 | 6/2013 | Sperry et al. |
| 2013/0275236 | A1 | 10/2013 | Koke et al. |
| 2014/0047964 | A1 | 2/2014 | Zhao |
| 2015/0224667 | A1 * | 8/2015 | Weber ............... B26D 7/0625 |
| | | | 83/23 |

\* cited by examiner

DELI SLICER AND PACKAGING SYSTEM

BACKGROUND OF THE INVENTION

Field of the Invention

The present invention relates generally to slicing devices. More particularly the present invention relates to an automated deli slicing device that automatically slices, weighs, packages, and dispenses deli items without the need for a human operator.

Description of Related Art

Current operations at present day deli counters involve a number of associates who manually serve deli items to each customer as requested. These associates interact with customers to determine the product selection, the quantity of product required, and potentially the thickness of slice preferred. Once the customer's order has been determined, the associate puts on a pair of gloves, selects the product, determines which of a number of slicers to use, and then sets up the slicer for the correct thickness. The associate then operates the slicer and produces the sliced product for the customer. Once the associate has sliced an assumed correct weight of the product, it is moved to a scale and weighed. If the assumption is incorrect, the associate must return to the slicer and create additional slices to correct the weight or remove slices to correct the weight. Once corrected, the scale may produce a label with the weight, price, and product information on it. The associate then places the sliced product into a bag and affixes the label to the outside of the bag. The associate then delivers the package to the customer, completing that deli transaction. The associate then returns the product from the slicer back to a storage area and then removes the gloves.

While this process is a tried and true method, it includes a number of steps that are time consuming, inefficient, and costly.

Therefore, what is needed is a system that may automate the process of slicing and packaging deli items.

SUMMARY OF THE INVENTION

The subject matter of this application may involve, in some cases, interrelated products, alternative solutions to a particular problem, and/or a plurality of different uses of a single system or article.

In one aspect, a slicer is provided. The slicer may be part of an automated deli slicing device. The slicer has a base which supports a conveyor. The conveyor passes over the top of the base and is capable of moving forwards and backwards in a reciprocating back and forth motion. A product carriage is positioned above the base over the conveyor and is separated from the conveyor by a spacing. The product carriage is reciprocally movable between a non-slicing position and a slicing position during a slicing operation. The conveyor is configured to move forward and backwards to follow the reciprocal motion of the product carriage during the slicing operation. A slicing blade is configured to cut a food product positioned within the product carriage. The slice may then fall to the conveyor below. As such, the product carriage moves back and forth over the blade, and with each passage over the blade, a slice from the food product is created. By the conveyor following the product carriage, an even stack of slices accumulates as the stack follows the slice being cut. Specifically, as the initial side of the slice lands, it is met by the moving stack, as opposed to falling on a stationary pile which leads to improper and uneven stacking. In one embodiment, the conveyor may fully follow the carriage through its entire motion, in another embodiment, the conveyor may follow the carriage only in the area where the slicing may occur. The slicing blade may have a releaser positioned on or by its rear face that is shaped to urge a sliced product off the blade to prevent a sticking of the product to the blade. Often, this releaser is shaped as a ramp—either angled or curving.

In one embodiment, the base may further have a shaped portion that is positioned below the releaser, this shaped portion is shaped to mirror a shape of the releaser. For example, if the releaser is an angled face, the shaped portion may be a downwardly angled face of the base that has an angle approximately equal to that of the releaser.

In another embodiment, the base of the slicer may be vertically movable in a downward and upward motion away from a closer to the blade and product carriage. This movement may be an incremental movement downward after each cutting motion of the carriage. The increment of movement may be the same distance as the thickness of the slice, such that the slice falls the same distance every time regardless of the quantity of food sliced. Once the slicing process concludes, the base may return to its home position for a new slicing operation.

DETAILED DESCRIPTION

Figure 1:
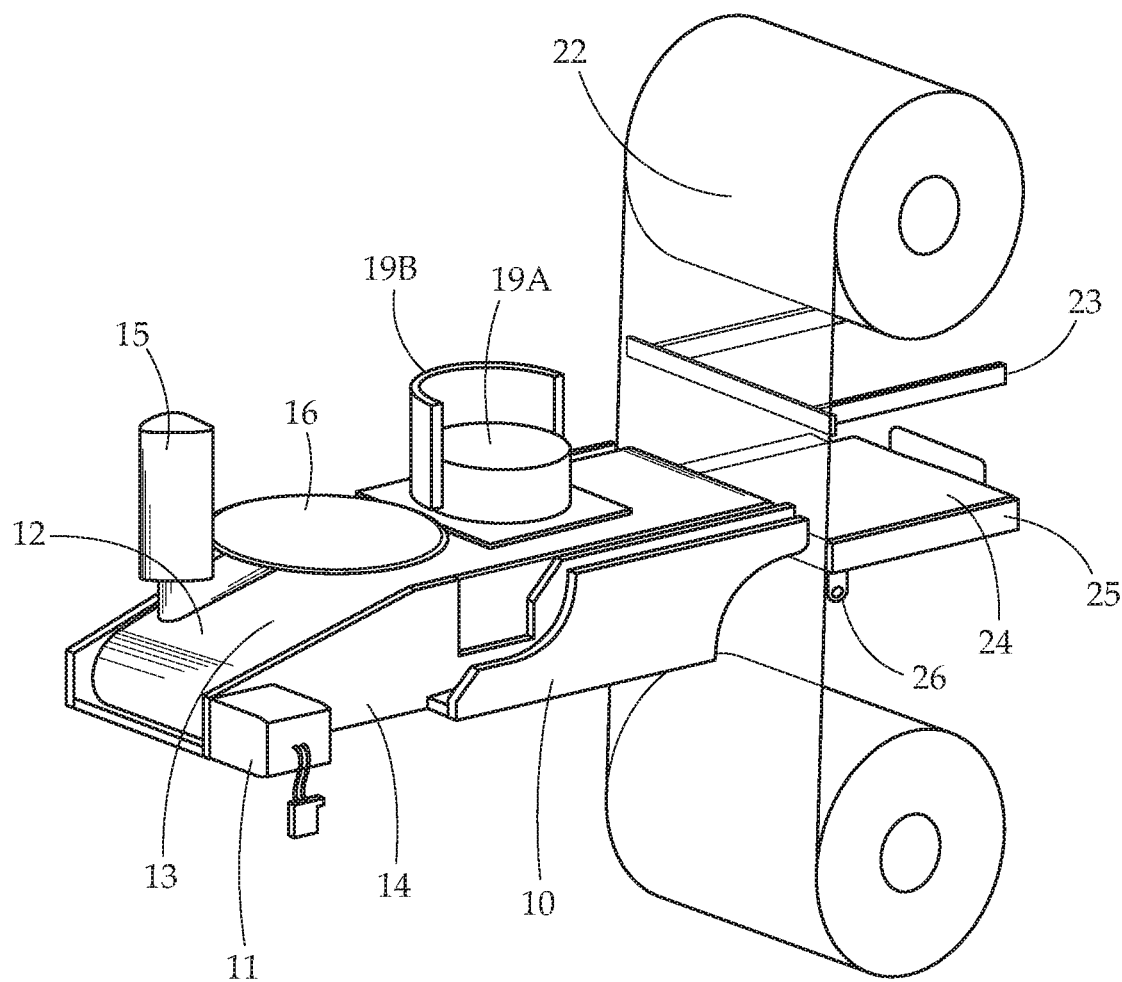
FIG. 1 provides a perspective view of an embodiment of the present invention.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a deli slicing machine that may provide automated slicing and packaging of a predetermined or input quantity of deli items (typically meat or cheese).

The primary object of this invention is to reduce the time spent waiting to be served at a market delicatessen (deli) counter by automating at least one of the cutting, packaging, and labeling of items that is currently handled manually. Other objectives of the invention may include the reduction of some deli counter associates, improved hygiene by reduction of handling, less potential for accidents by reducing human interaction with the slicing process, and greater accuracy of delivery of the weight requested by the customer. The methodology for doing this allows the customer to select, for example, the thickness of the slices, the total weight of product to be delivered, and/or the number of slices to be delivered. This action is performed via a touch panel on the customer side of the equipment. Entering this information, initiating operation, and removing the completed package may be the only customer interaction with the equipment. On the working side of the equipment the counter associate will be required only when the product or packaging materials need to be replenished. Also, associate monitoring may be useful in the event that the equipment has some type of product related malfunction, which is expected to be very rarely.

The present invention utilizes a conveyor that is movable both forward and backwards and upwards and downwards to optimize the stacking of cut items during the slicing process. This operation, coupled with the unique structure of the conveyor and base provide advantageous distinctions from the prior art, among other unique aspects of the present invention.

In some embodiments, the automated deli slicer may have a computerized controller. The computerized controller may comprise include a processor, memory, and an input system, among other aspects. The computerized controller may be programmed or pre-programmed to control the various mechanical elements to operate the system and output a packaged, sliced deli product. For example the controller may be programmed to output one pound of sliced ham.

In further embodiments, the automated deli slicer of the present invention may be in communication with a computerized interface. This interface may be consumer-facing in some embodiments, or may be operated by a dedicated operator in either retail or non-retail settings. In one embodiment, the computerized interface may be a touch screen allowing the user (deli customer, associate, etc.) to select a type of deli product (for example a meat item or cheese item) and the weight or number of slices desired. In some cases the user may also select slice thickness. Once input, the user may initiate operation of the slicer, or this operation may begin as soon as all information is received. Once the slicer has completed the operation, the system will output a packaged, labeled and sliced product as input by the user.

Figure 2:
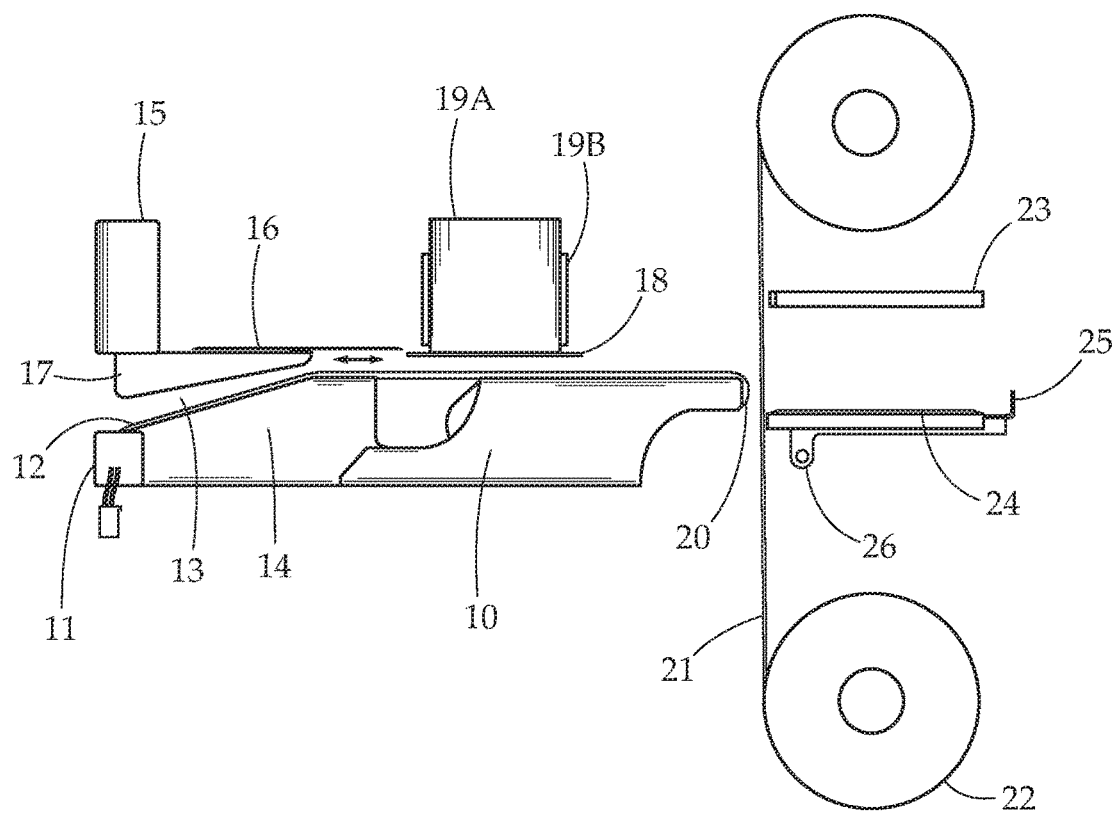
FIG. 2 provides a side view of an embodiment of the present invention.

Turning now to FIGS. 1 and 2, a perspective and side view of an embodiment of the present invention is provided. The slicer has a base 10 with a conveyor 12 mounted thereon. The conveyor may move an item resting on it forward and backwards along the top length of the base 10, as controlled by motor 11. The base 10 also has a nose 20 at a front end, and shaped portion shown here as a sloping portion 14 at the opposite end. The sloping portion 14 is structured to be parallel to, or approximately parallel to (+/−15 degrees) the sloped releaser 17 which operates to urge sliced product off of a rear of the slicing blade 16. The belt 12 passes over the top surface of the base 10 including the sloping portion 14, a flat central area, and the nose 20.

A deli product carriage 19b holds a quantity of non-sliced deli product 19a. This carriage is configured for reciprocating back and forth movement (using a motive source such as a motor (not shown), for example) over blade 16 to achieve slicing. The spacing between a bottom of the product 19a and blade 16 determines the thickness of the slice, and may be adjustable by control of the position of product support plate 18. Accordingly, in some embodiments, product support plate 18 may be movable, either manually or through an automated mechanism controlled by the computerized controller.

In some embodiments, a scale may be included anywhere on the device to weigh the quantity of sliced product. This scale may be in communication with the computerized controller, which may use the input from the scale to control slicing operation stopping once a selected weight has been sliced. In a particular embodiment, the scale may be positioned on the carriage 19b and support plate 18 assembly. In this embodiment, the scale may measure the difference in weight of the product 19a before slicing started and after slicing has completed and/or after each slice motion.

In other embodiments, a slice counter may be utilized to measure the amount of product sliced. The slice counter may be in communication with the computerized controller, which may use its input to control slicing operation. The slice counter may be any structure capable of counting slices. For example, slice count may be monitored by revolutions of the carriage motion. In another embodiment, an optical sensor may be used to count slices. In still another embodiment, base position and movement may be used to count slices.

Blade 16 may be any cutting solution, but in the embodiment shown is a rotating circular blade 16 rotated by motor 15. Closely below the blade 16 is a sloped releaser 17 which is angled downward and serves to urge each slice off the rear of the blade. It should be understood that any sort of releasing structure may be used to release a sticking product from the blade without straying from the scope of the present invention. Upon a slice being released from the rear of the blade 16, it will fall a short distance across spacing 13 at least partially onto the sloping portion 14. In varying embodiments, anywhere from approximately 5-100% of the area of the slice may rest initially on this portion 14 after slicing.

In operation, as will be demonstrated with discussion below of additional figures, the conveyor 12 moves so as to mirror the reciprocating movement of the carriage 19b. Accordingly, after a first slice is received by the downward angled face, it will be moved forward towards the nose 20 of the base 10 in alignment with the carriage 19b and product 19a. When the carriage 19b moves back towards the blade 16 for an additional slice, the conveyor 12 also moves back, such that as the next slice is cut, it is dropped onto the slice already on the conveyor 12. Further, the base 10 is positioned on a mechanism configured to move downward incrementally one slice width at a time, allowing the space 13 between the releaser 17 and blade 16 to be the same each time a slice is cut. This may allow for optimal and controlled stacking of the slices.

A packaging portion of the automated deli slicer may be positioned slightly beyond the nose 20 of the base 10. The packaging portion includes a delivery tray 25 which receives the stack of sliced deli product once sliced. A hinge 26 in this embodiment allows the delivery tray to swing downward thereby releasing the sliced deli product once packaged. However, any other release and or delivery mechanisms may be used without straying from the scope of the present intention. A three sided backup seal 24 is formed on the top of the delivery tray 25. For packaging, a quantity of film 21 is positioned on two rollers above and below the tray 25. A three sided seal bar 23 is positioned above the delivery tray 25. In operation, a quantity of sliced deli product may be passed into the film 21, which envelops the product. The seal bar 23 then closes onto the backup seal 24, cutting the film 21, and also re-connecting it, the seal bar 23 also seals the product in a four sided bag. Once bagged, the delivery tray 25 swings downwardly about hinge 26, releasing the packaged and sliced product.

Figure 3:
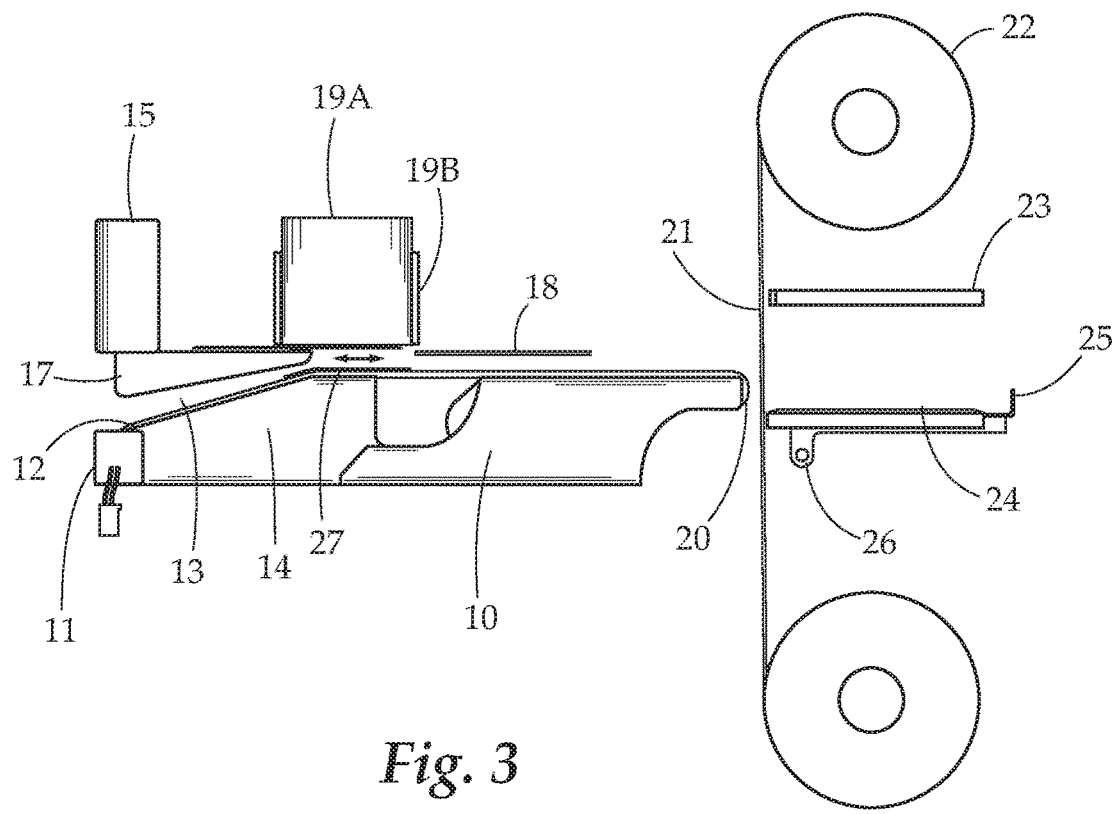
FIG. 3 provides a side view of an embodiment of the present invention in slicing operation.
Figure 4:
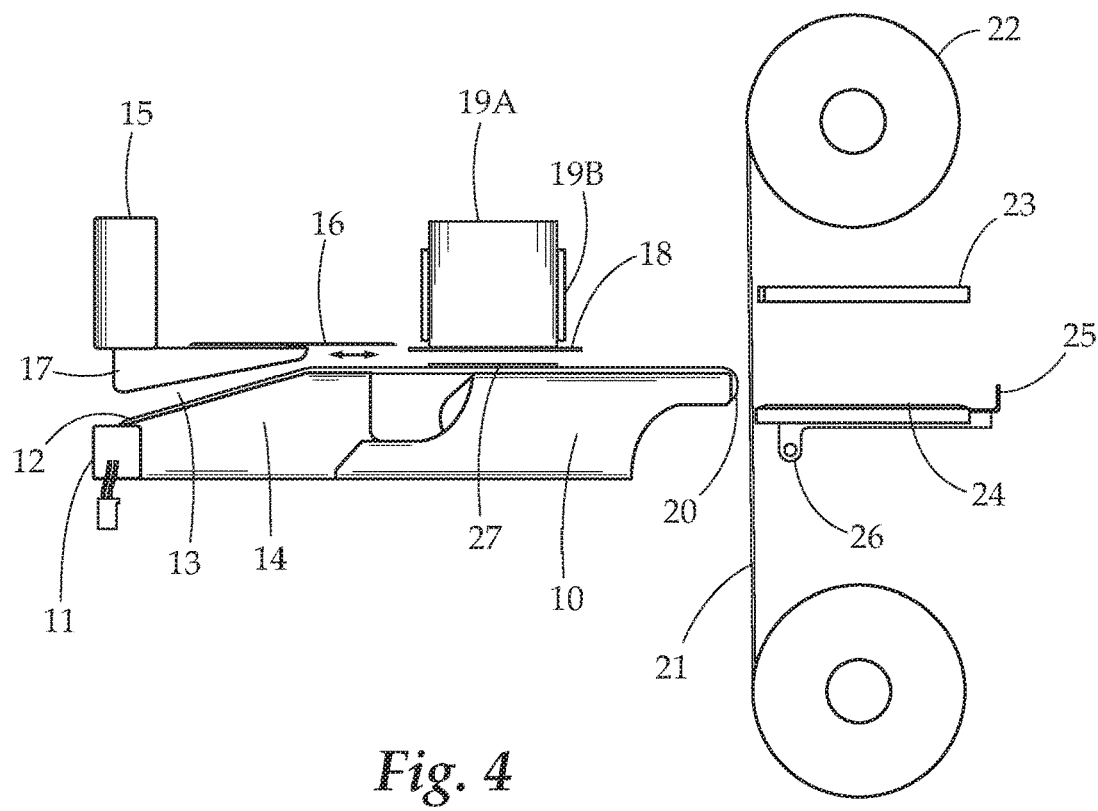
FIG. 4 provides a side view of another embodiment of the present invention in slicing operation.
Figure 5:
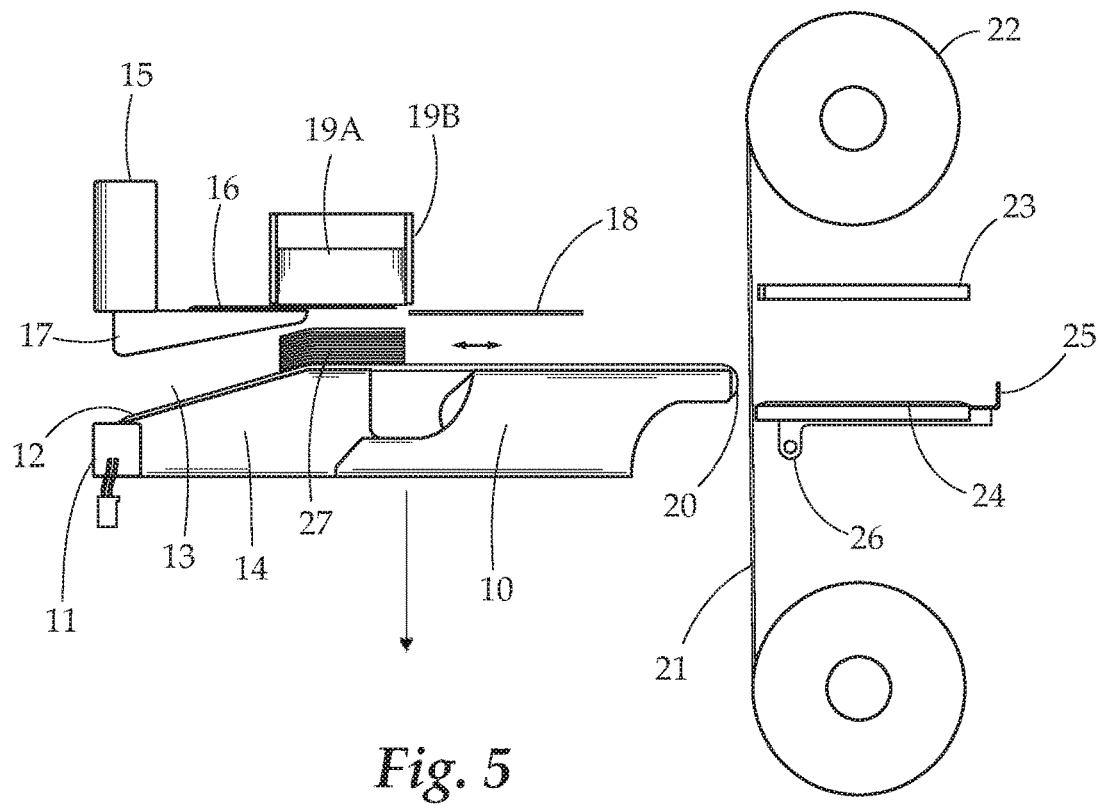
FIG. 5 provides a side view of yet another embodiment of the present invention in another stage of slicing operation.

FIGS. 3-5 provide views of the present invention in operation at various stages of the slicing process. FIG. 3 provides a view of the slicer after a first slice 27 has been cut. The slice falls on the sloping portion 14 and rests on the conveyor 12. When the advance of the carriage 19b is complete, both the conveyor 12 and carriage 19b stop. The carriage 19b returns to the start position and the conveyor 12 follows this movement. As the deli product 19a retracts, the conveyor 12 and slice 27 resting on it moves to mirror the product 19a above. As the next slice is cut, the conveyor 12 similarly moves to mirror the uncut product 19a to keep the slice 27 below it at all times. This operation may, among other advantages, provide for a reliable and even stack of slices. Further, as indicated by the downward arrow, for each slice that is cut, the base 10 moves down incrementally by the thickness of each slice 27. So for example if the slice is ⅛ inch thick, the base 10 moves downward away from the blade 16 by ⅛ inch each time the slicing is done. In one embodiment, the movement may be initiated by the position of the carriage 19b. The slicer carriage 19b and conveyor 12 continue in this fashion until the required weight or number of slices has been delivered to the conveyor 12. In this way, the stack of sliced product is very uniform.

As seen in FIG. 4, as the carriage 19b moves back away from blade 16, the conveyor 12 and the stack of slices 27 thereon follows. As the stack of slices 27 accumulates, the conveyor 12 tracks the motion of the carriage 19b to ensure the slices 27 accumulate evenly and with little to no distortion. In a particular embodiment, the slicer may be configured to automatically insert a sheet of, for example, paper, plastic, and the like, between each slice.

FIG. 5 provides a view of the automated deli slicer after cutting a number of slices. As can be seen the stack of slices 27 has accumulated in an even fashion. Further, base 10 has moved downward away from the blade incrementally slice width by slice width. Conveyor 12 will continue to move so that stack of slices 27 follows the carriage 19b until the slicing has completed.

Figure 6:
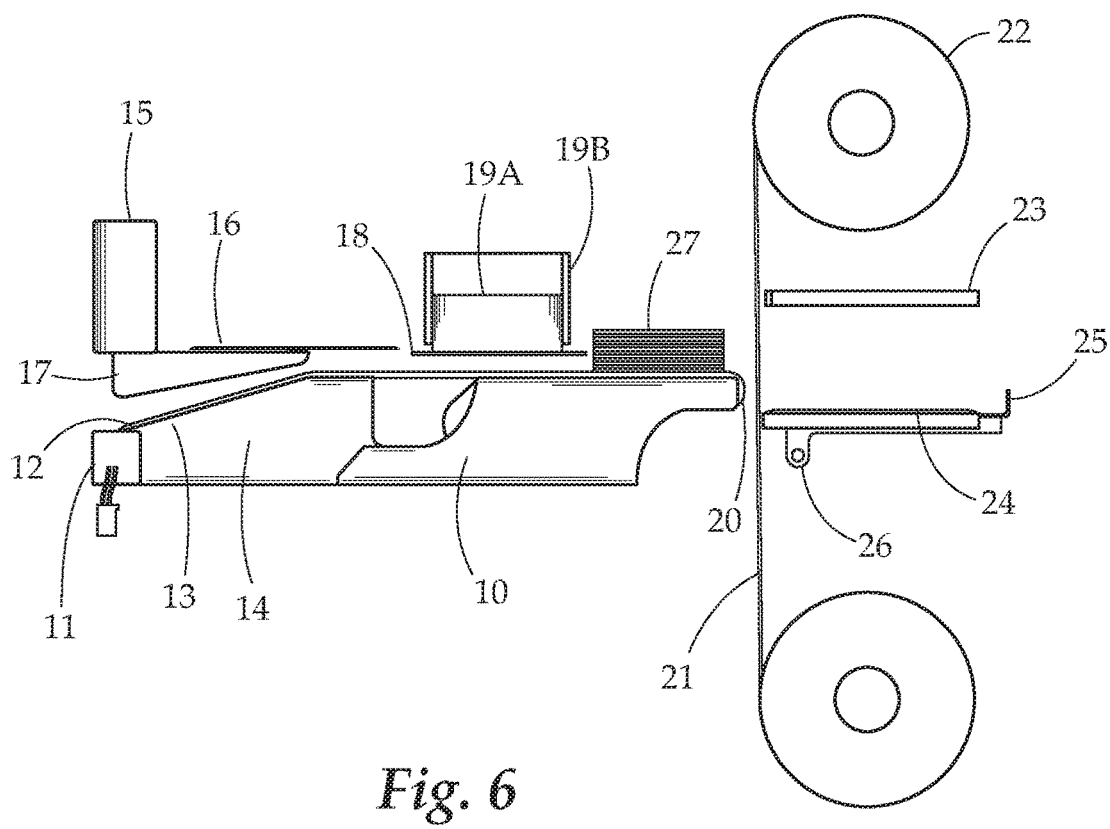
FIG. 6 provides a side view of an embodiment of the present invention after completion of slicing operation.
Figure 7:
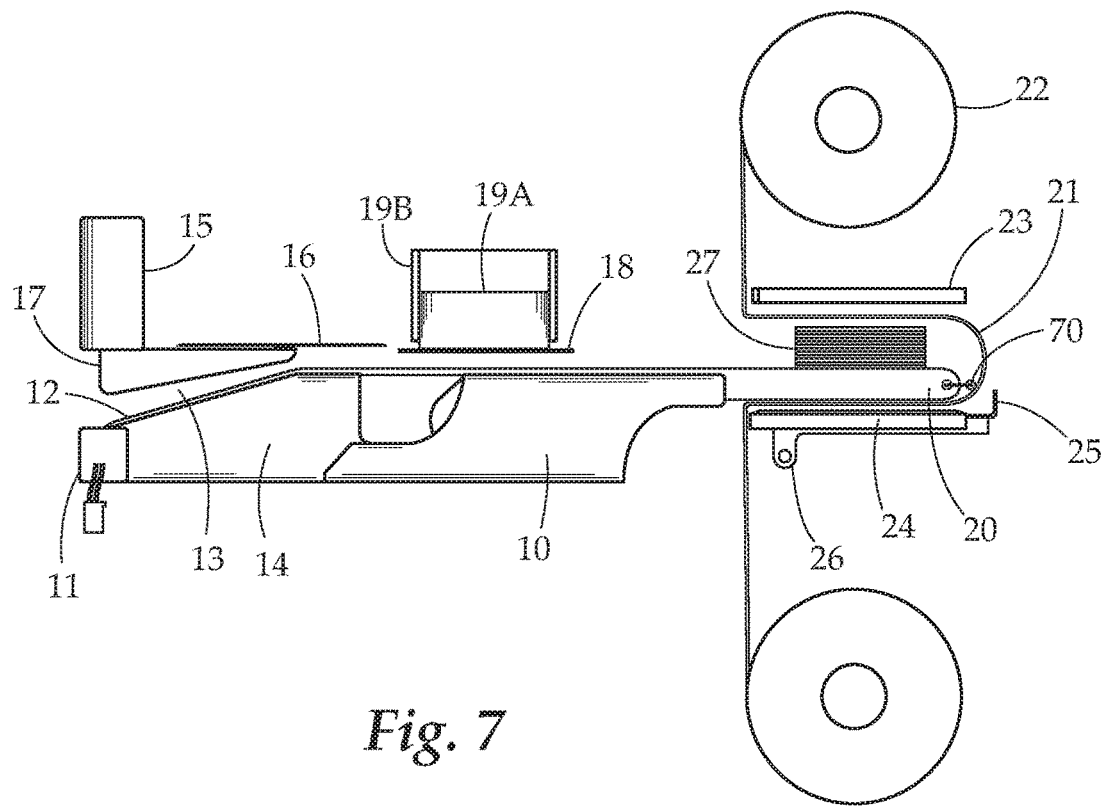
FIG. 7 provides a side view of an embodiment of the present invention in packaging operation.
Figure 8:
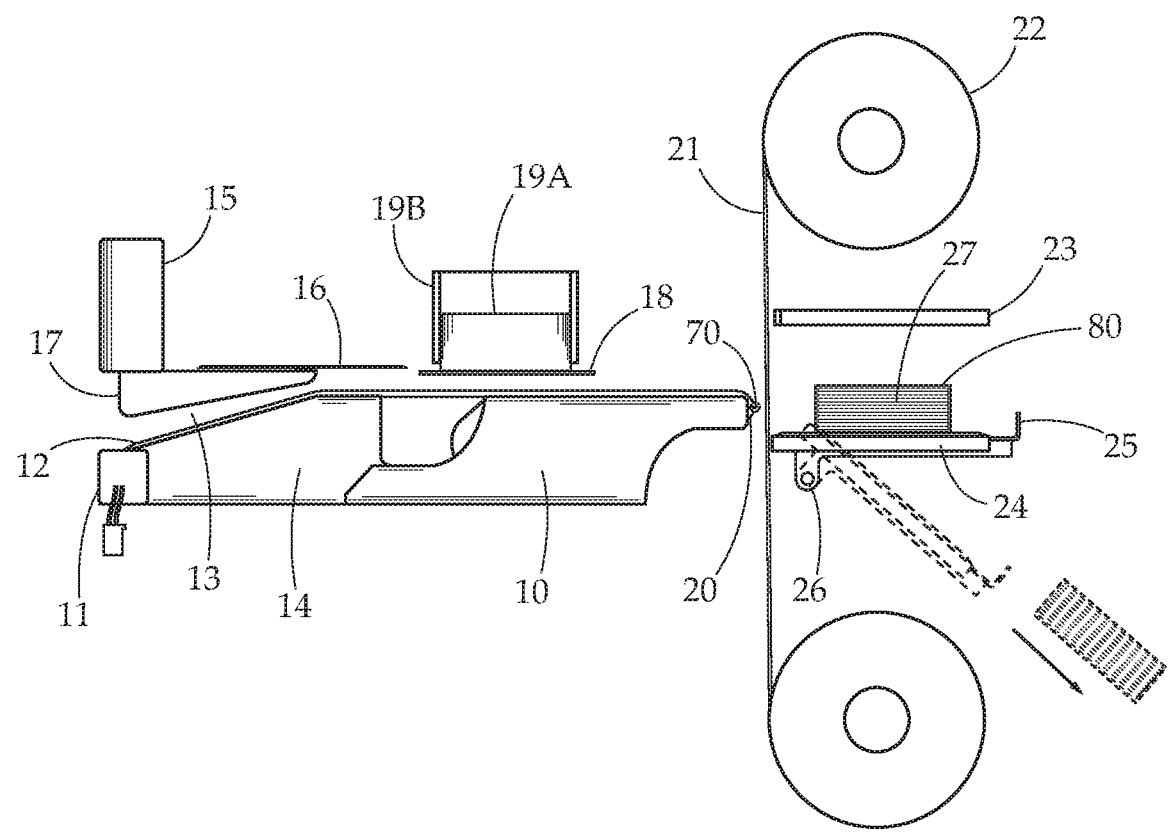
FIG. 8 provides a side view of another embodiment of the present invention in packaging operation.

FIGS. 6-8 provide views of the operation of the packaging portion of the present invention. FIG. 6 provides a view of stack of slices 27 after the slicing has completed. The conveyor 12 has moved the stack of slices 27 to the nose 20 of the base 10. The carriage 19b has returned to a "home" resting position when not in use. The base 10 is moved back up to its initial starting position closer to the blade 16.

FIG. 7 shows operation of an extending nose feature of the present invention. In this embodiment, nose 20, along with conveyor 12 and stack of slices 27 extends outwardly into the film to deliver the completed stack to the delivery tray 25. The conveyor 12 may then slowly move as the nose 20 retracts, causing the stack of slices 27 to be deposited onto the delivery tray 25. It should be understood at this point that the film 21 has enveloped the stack of slices 27. In some embodiments, a blocker bar 70 may extend from the nose 20. The blocker bar is used to hold the film 21 away from the front of the nose 20 which has the conveyor 12 moving over it. This prevents film 21 from sticking to conveyor 12 and being caught and drawn excessively by conveyor 12 movement. Once the stack of slices 27 has been transferred to the tray 25 and the nose 20 is retracted, seal bar 23 may move downward and seal over the film 21, simultaneously forming a bag, and also joining the film layers back together to make a continuous sheet.

FIG. 8 provides a view of the stack of slices 27 of sliced deli product packaged in a bag 80 that is fully sealed. An optional labeling machine, such as a coding and tagging device (not shown) controlled by the computerized controller may create and place a label containing the product, weight, barcode, and/or price information on the bag, identifying its contents (not shown). The computerized controller may receive information such as a weight of the deli product from the scale, which may be, in this embodiment, in communication with the computerized controller. As shown in broken lines, the tray 25 may swing about hinge 26, releasing the bag 80 from the automated deli slicer. The slicer is again ready to cut and package the next order.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed:

1. A slicer comprising:
   a base, the base supporting a conveyor, the conveyor contacting and passing over at least part of a top surface of the base and capable of moving in a forward and backwards direction;
   a product carriage positioned above the base over the conveyor, separated from the conveyor by a spacing, the product carriage reciprocally movable between a non-slicing position and a slicing position during a slicing operation; and
   a slicing blade configured to cut a food product positioned within the product carriage into a slice as the product carriage is moved to the slicing position;
   wherein the conveyor is configured to translate forward and backwards to follow the reciprocal motion of the product carriage during the slicing operation.

2. The slicer of claim 1 wherein the base is movable in a downward motion away from the blade and product carriage, the base configured to move downward incrementally after each reciprocal movement of the product carriage during the slicing operation.

3. The slicer of claim 2 wherein the incremental downward movement increment is equal to a slice thickness.

4. The slicer of claim 1 further comprising a packaging assembly configured to package a quantity of sliced food product and dispense the packaged quantity of sliced food product from a delivery tray.

5. The slicer of claim 4 wherein the packaging assembly comprises a plastic film wrapped about two rollers, the rollers separated by a spacing, the film crossing the spacing and positioned to envelop the quantity of sliced food product and comprising a seal bar that cuts and seals the plastic film about the quantity of sliced food product forming a packaged food product.

6. The slicer of claim 4 wherein the base comprises an extendable nose, the extendable nose moveable from a first retracted position, to a second extended position, the conveyor positioned over the nose, the nose, when in the extended position, being above the delivery tray.

7. The slicer of claim 1 further comprising a computerized controller, the computerized controller configured to control operation of the slicer, the operation of the slicer comprising the reciprocal movement of the product carriage and following movement of the conveyor for a predetermined period to create a quantity of sliced food product.

8. The slicer of claim 7 further comprising a computerized input device in communication with the computerized controller, the computerized input device configured to receive an input relating to the slicer operation, the computerized controller configured to receive the input and operate the slicer for the predetermined period, the predetermined period based on the input.

9. A slicer comprising:
   a base, the base supporting a conveyor, the conveyor contacting and passing over at least part of a top surface of the base and capable of moving in a forward and backwards direction;
   a product carriage positioned above the base over the conveyor, separated from the conveyor by a spacing, the product carriage reciprocally movable between a non-slicing position and a slicing position during a slicing operation;
   a slicing blade configured to cut a food product positioned within the product carriage into a slice as the product carriage is moved to the slicing position;
   wherein the conveyor is configured to translate forward and backwards to follow the reciprocal motion of the product carriage during the slicing operation; and
   wherein the base is movable in a downward motion away from the blade and product carriage, the base configured to move downward incrementally after each reciprocal movement of the product carriage during the slicing operation.

10. The slicer of claim 9 wherein the incremental downward movement increment is equal to a slice thickness.

11. The slicer of claim 9 further comprising a packaging assembly configured to package a quantity of sliced food product and dispense the packaged quantity of sliced food product from a delivery tray.

12. The slicer of claim 11 wherein the packaging assembly comprises a plastic film wrapped about two rollers, the rollers separated by a spacing, the film crossing the spacing and positioned to envelop the quantity of sliced food product and comprising a seal bar that cuts and seals the plastic film about the quantity of sliced food product forming a packaged food product.

13. The slicer of claim 9 further comprising a scale positioned on the product carriage, the scale configured to weigh the food product positioned in the product carriage.

14. The slicer of claim 9 further comprising a computerized controller, the computerized controller configured to control operation of the slicer, the operation of the slicer comprising the reciprocal movement of the product carriage and following movement of the conveyor for a predetermined period to create a quantity of sliced food product.

15. The slicer of claim 14 further comprising:
   a computerized input device in communication with the computerized controller, the computerized input device configured to receive an input relating to the slicer operation, the computerized controller configured to receive the input and operate the slicer for the predetermined period, the predetermined period based on the input;
   a scale positioned on the product carriage, the scale configured to weigh the food product positioned in the product carriage, the scale in communication with the computerized controller, and configured to provide an output to the computerized controller, the computerized controller configured to automatically convert the output of the scale to a weight;
   a labeling machine configured to apply a label to the packaged food product, the labeling machine in communication with the computerized controller; and
   wherein the computerized controller is configured to control the labeling machine to provide a weight output and a price output based on the weight, the weight output and price output being marked on the label.

16. An automated slicer comprising:
   a computerized input device in communication with a computerized controller, the computerized input device configured to receive an input that defines a slicing operation, the computerized controller configured to receive the input and operate the slicer in a particular manner and for a predetermined period to perform the defined slicing operation;
   wherein the automated slicer further comprises:
      a base, the base supporting a conveyor configured to contact and pass over at least part of a top surface of the base and capable of moving in a forward and backwards direction, wherein the conveyer movement is controlled by the computerized controller in accordance with the input-defined slicing operation;
      a product carriage positioned above the base over the conveyor, separated from the conveyor by a spacing, wherein the product carriage is configured to move reciprocally between a non-slicing position and a slicing position, wherein the product carriage movement is controlled by the computerized controller in accordance with the input-defined slicing operation; and
      a slicing blade configured to cut a food product positioned within the product carriage into a slice as the product carriage is moved to the slicing position;
      wherein the conveyor is configured to translate forward and backwards to follow the reciprocal motion of the product carriage to perform the input-defined slicing operation, and the conveyor's translational movement is controlled by the computer controller in accordance with the input-defined slicing operation.

17. The automated slicer of claim 16, wherein the input-defined slicer operation may include parameters selected from the group consisting of a weight of product desired, a number of slices of product desired, and a desired thickness of slices of product.

18. The automated slicer of claim 16, wherein the slicer further comprises a packaging assembly configured to package a quantity of sliced food product and dispense the packaged quantity of sliced food product from a delivery tray, the packaging assembly controlled by the computerized controller in accordance with the input-defined slicing operation.

19. The automated slicer of claim 18, wherein the packaging assembly comprises a plastic film wrapped about two rollers, the rollers separated by a spacing, the film crossing the spacing and positioned to envelop the quantity of sliced food product and comprising a seal bar that cuts and seals the plastic film about the quantity of sliced food product forming a packaged food product.

20. The automated slicer of claim 19, further comprising a labeling machine configured to apply a label to the packaged food product, the labeling controlled by the computerized controller in accordance with the input-defined slicing operation.

* * * * *